United States Patent
Lin

(10) Patent No.: US 7,010,627 B2
(45) Date of Patent: Mar. 7, 2006

(54) METHOD AND APPARATUS FOR IMPLEMENTING HOT KEY FUNCTIONS

(75) Inventor: Chia Huang Lin, Taipei (TW)

(73) Assignee: Mitac Technology Corp., Hsin-Chu Hsien (TW)

( * ) Notice: Subject to any disclaimer, the term of this patent is extended or adjusted under 35 U.S.C. 154(b) by 0 days.

(21) Appl. No.: 10/959,226

(22) Filed: Oct. 6, 2004

(65) Prior Publication Data

US 2005/0044296 A1 Feb. 24, 2005

Related U.S. Application Data

(63) Continuation-in-part of application No. 10/352,402, filed on Jan. 28, 2003.

(30) Foreign Application Priority Data

Nov. 12, 2002 (TW) ............................. 91133182 A

(51) Int. Cl.
*G06F 13/12* (2006.01)
(52) U.S. Cl. ..................................... 710/67
(58) Field of Classification Search ................. 710/62, 710/67
See application file for complete search history.

(56) References Cited

U.S. PATENT DOCUMENTS

| | | | | |
|---|---|---|---|---|
| 5,056,057 A | * | 10/1991 | Johnson et al. ............... 710/73 |
| 5,926,166 A | * | 7/1999 | Khederzadeh et al. ...... 345/581 |
| 5,937,200 A | * | 8/1999 | Frid et al. ................... 710/264 |
| 6,266,714 B1 | * | 7/2001 | Jacobs et al. ................. 710/14 |
| 2003/0063071 A1 | * | 4/2003 | Wyatt ......................... 345/172 |

* cited by examiner

*Primary Examiner*—William M. Treat
*Assistant Examiner*—David Martinez
(74) *Attorney, Agent, or Firm*—Quintero Law Office

(57) ABSTRACT

An apparatus and method for utilizing software to implement hot key functions without an embedded controller. A keyboard with hot keys, a keyboard encoder and a software driver module utilizes a software solution to implement hot key switching and hot key functions in a computer system without an embedded controller, providing the same functionality as a computer system with embedded controller.

9 Claims, 2 Drawing Sheets

METHOD AND APPARATUS FOR IMPLEMENTING HOT KEY FUNCTIONS

CROSS-REFERENCE TO RELATED APPLICATION

This application is a continuation-in-part (CIP) of U.S. application Ser. No. 10/352,402 entitled "METHOD AND APPARATUS FOR IMPLEMENTING HOT KEY FUNCTIONS", filed on Jan. 28, 2003, which is hereby incorporated by reference.

BACKGROUND OF THE INVENTION

1. Field of the Invention

The present invention relates to a hot key implementation technology, and in particular to an apparatus and method for utilizing software to implement hot key functions without an embedded controller.

2. Description of the Related Art

Present computer systems utilize embedded controller to implement hot key switching and hot key functions, such as in notebooks. Nevertheless, in situations, a computer system may not comprise an embedded controller, presenting inconvenience for users who require hot key functions. Unfortunately, designing hardware to specifically implement hot key switching for a computer system without an embedded controller is costly in both research and production.

SUMMARY OF THE INVENTION

Accordingly, an object of the invention is to provide an apparatus and method for utilizing software to implement hot key functions without an embedded controller. The invention utilizes software to implement hot key functions for a computer system without an embedded controller, providing the same hot key functions as a computer system with embedded controller. The apparatus and method disclosed by the invention are not costly and can resolve the present problems.

To achieve the present objects, the invention discloses an apparatus for utilizing software to implement hot key functions without an embedded controller, comprising a keyboard with hot keys, a keyboard encoder, and a software driver module.

The keyboard with hot keys can be a standard keyboard or a specifically designed keyboard. If the keyboard is a standard keyboard, hot keys can be provided by assigning existing keys on the standard keyboard. If the keyboard with hot keys is a specifically designed keyboard, hot keys can be provided by attaching dedicated keys to a standard keyboard.

The keyboard encoder is coupled with the keyboard with hot keys and produces corresponding scan code according to the hot key used. When hot keys are used, the keyboard encoder produces and transmits a corresponding scan code. Conventionally, in a computer system with embedded controller, this scan code is received by the embedded controller and identifies the hot key used.

The software driver module is coupled with the keyboard encoder, comprising at least one software program. The software programs can be provided by any computer-executable program language, such as C, C++. The software driver module receives the scan code from the keyboard encoder and identifies the hot key used based on the scan code. If the scan code corresponds to a system BIOS, the software driver module transmits a system management interrupt to notify a system BIOS. Next, the BIOS initiates a system service routine to execute the hot key function according to the system management interrupt.

Alternatively, if the software driver module identifies the scan code corresponding to an application program, the software driver module initializes a corresponding application program to execute the hot key function. That is, after the software driver module identifies the scan code from the keyboard encoder, the software driver module may initialize an application program directly without passing through the system BIOS.

The scan code identification can be accomplished by referring to a default table. The default table records the scan code and the functions thereof. Thus, the software driver module can determine to notify a system BIOS or to initialize an application program.

In addition, the invention discloses a method for utilizing software to implement hot key functions without an embedded controller. First, a keyboard with hot keys, a keyboard encoder, and a software driver module are provided in a computer system without an embedded controller. The keyboard encoder produces scan code from hot key used. The software driver module includes software programs.

When hot keys are used, the keyboard encoder produces and transmits a corresponding scan code. The software driver module receives the scan code from the keyboard encoder, identifies the hot key used, and transmits a corresponding system management interrupt to notify a system BIOS. The BIOS then initiates a system service routine to execute hot key function according to the system management interrupt, thus enabling hot key functions without an embedded controller.

Here, instead of transmitting a corresponding system management interrupt, if the software driver module identifies the scan code corresponding to an application program, a corresponding application program for executing the hot key function is initialized by the software driver module directly.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

Figure 1:
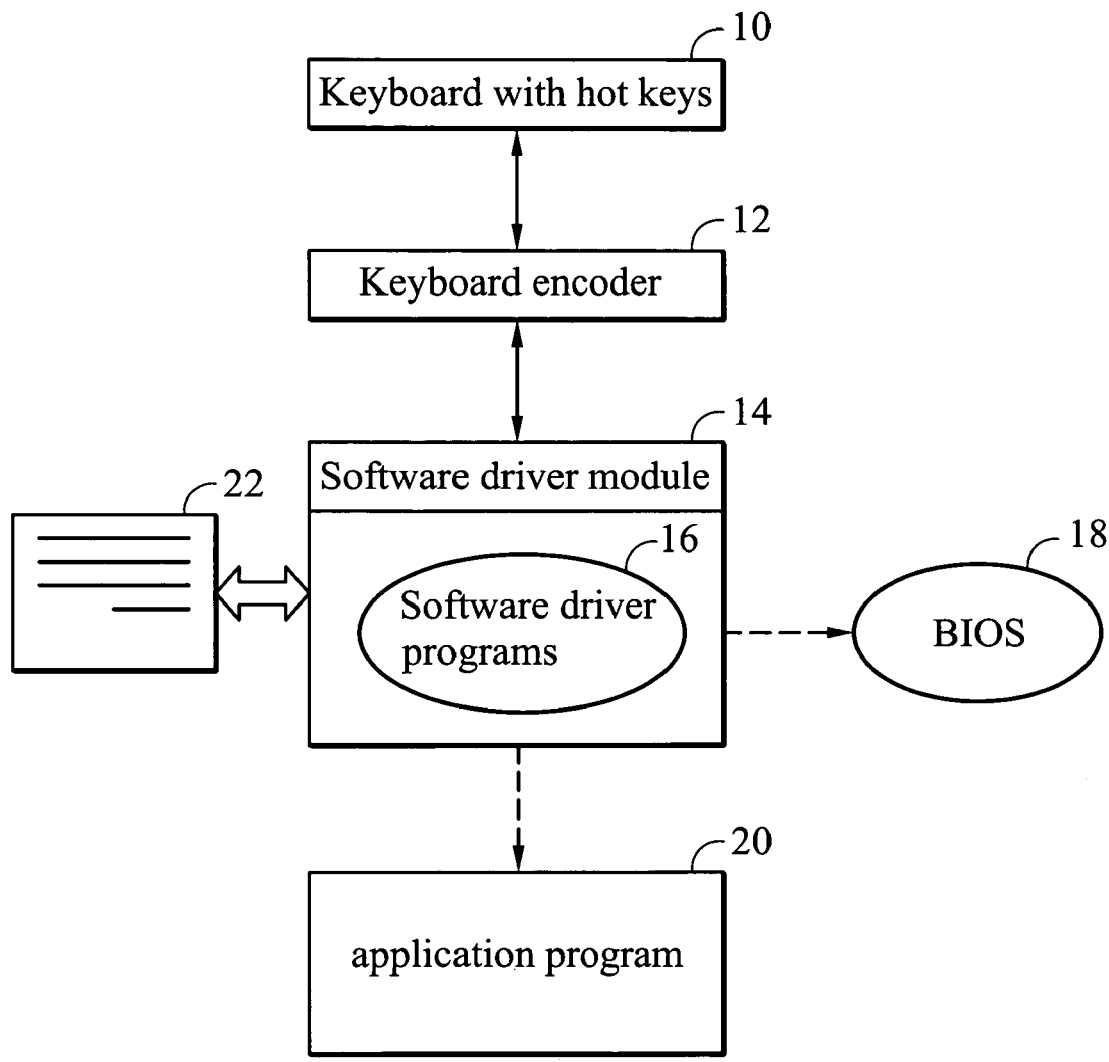
FIG. 1 is a diagram of the apparatus for utilizing software to implement hot key functions without an embedded controller.

FIG. 1 is a diagram of the apparatus for utilizing software to implement hot key functions without an embedded controller. The inventive apparatus comprises a keyboard with hot keys 10, a keyboard encoder 12, and a software driver module 14.

The keyboard with hot keys 10 can be provided by a standard keyboard or by a specifically designed keyboard. If the keyboard with hot keys 10 is a standard keyboard, hot keys can be provided by assigning existing keys in the standard keyboard layout, such that there are no extra keys required on the keyboard. If the keyboard with hot keys 10 is a specifically designed keyboard, extra keys are disposed on the keyboard for use as hot keys. For example, if the desired function is CD/MP3, a corresponding hot key is disposed on the keyboard, which, when used, enables CD/MP3 function.

The keyboard encoder 12 is coupled with the keyboard with hot keys 10 and produces a scan code according to the hot key used. When hot keys 10 are used, the keyboard encoder 12 produces and transmits a corresponding scan code. The invention utilizes a software solution to receive the scan code from the keyboard encoder 12 and identify the hot key used based on the scan code.

The software driver module 14 is coupled with the keyboard encoder 12, comprising software driver programs 16, provided by any computer-executable program language. The software driver module 14 receives the scan code from the keyboard encoder 12 and identifies the hot key used accordingly. The software driver module 14 accomplishes the identification according to a default table 22. The default table records the scan code and the functions thereof.

After the software driver module 14 accomplishes the identification, the scan code is determined if it corresponds to a system BIOS 18 or an application program 20. If the scan code corresponds to the system BIOS 18, the software driver module sends the corresponding system management interrupt to notify a system BIOS 18. The BIOS 18 then initiates the corresponding system service routine to execute the hot key function according to the received system management interrupt. If the scan code corresponds to an application program, the software driver module 14 initializes an application program corresponding to the identified hot key directly.

As given above, the invention utilizes software to implement hot key functions in a computer system without an embedded controller. In the described aspect of the hardware equipment for computer system, the method of the invention requires no costly redesign of hardware. For users, the method of the invention requires no change in operating methods.

Figure 2:
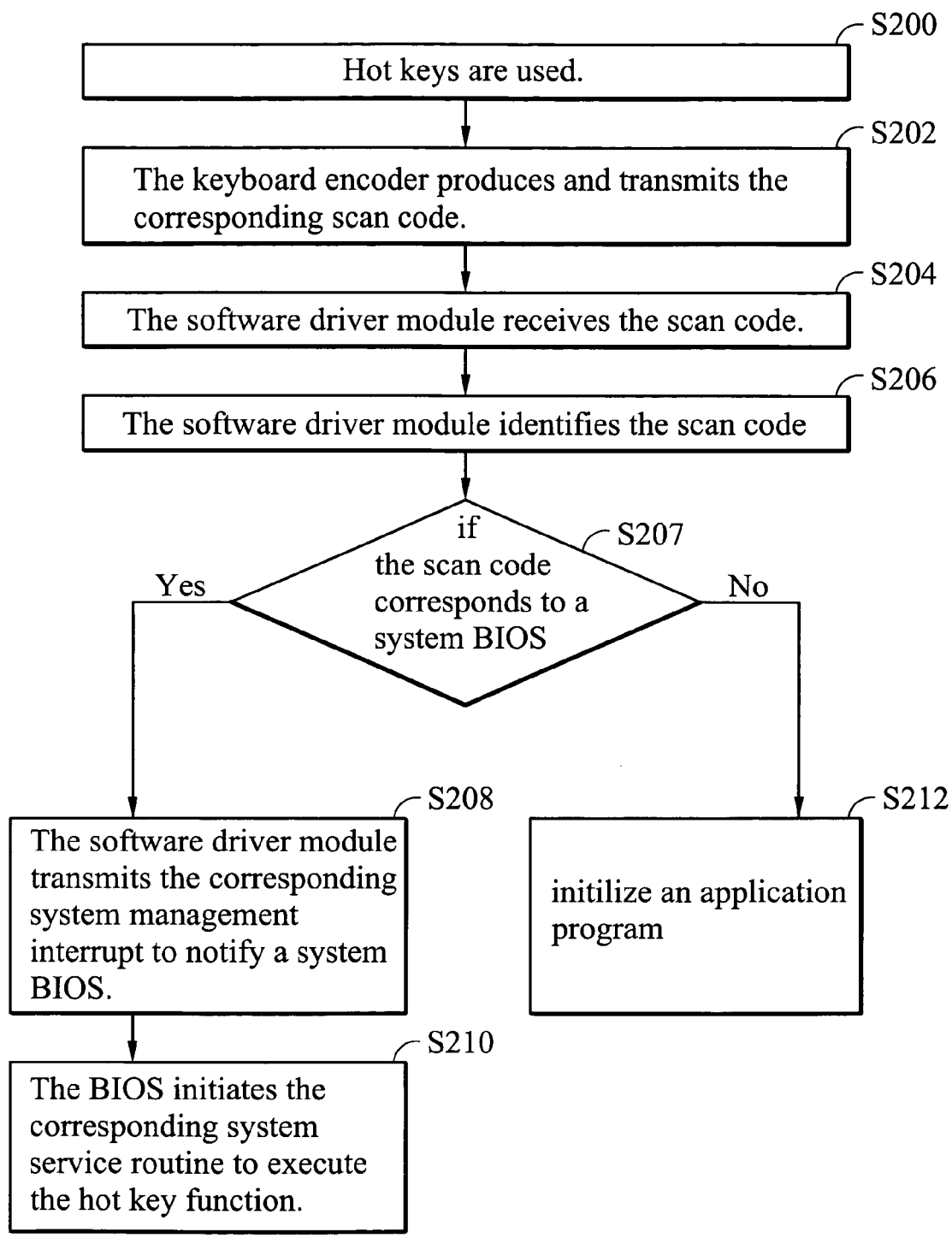
FIG. 2 is a flowchart of the method for utilizing software to implement hot key functions without an embedded controller.

FIG. 2 is a flowchart of the method for utilizing software to implement hot key functions without an embedded controller, according to the invention. First, a keyboard with hot keys, a keyboard encoder, and a software driver module is provided in a computer system without an embedded controller.

The keyboard with hot keys can be provided by a standard keyboard or a specifically designed keyboard. The keyboard encoder produces a corresponding scan code according to the hot key used. The software driver module includes software driver programs, provided by any computer-executable program language, and receives the hot key scan code, identifies the hot key used, and transmits a system management interrupt to notify a system BIOS.

When hot keys are used (step S200), the keyboard encoder produces and transmits the corresponding scan code (step S202). The software driver module receives the scan code from the keyboard encoder (step S204), and identifies the scan code (step S206).

Next, the scan code is determined if it corresponds to a system BIOS (step S207). If the scan code corresponds to the system BIOS, the software driver module transmits the corresponding system management interrupt to notify a system BIOS according to the hot key scan code (step S208). The BIOS then initiates the corresponding system service routine to execute the hot key function chosen according to the received system management interrupt (step S210). If the scan code corresponds to an application program, the software driver module initializes an application program (step S212).

For example, in FIG. 2, if the keyboard with hot keys is the specifically designed keyboard, dedicated hot keys are disposed thereon. If the desired function is CD/MP3, a corresponding key is provided on the keyboard, which, when used (step S200), initiates the keyboard encoder to produce corresponding scan code (step S202). The software driver module receives the hot key scan code from the keyboard encoder (step S204) and identifies the hot key used as the CD/MP3 function key (step S206).

The software driver module accomplishes the identification according to a default table. The default table records the functions corresponding to the scan code. The software driver module can determine if the scan code corresponds to a system BIOS or an application program (step S207).

If the scan code corresponds to the system BIOS, the software driver module transmits the system management interrupt to notify a system BIOS according to the scan code (step S208). The BIOS initiates the system service routine to execute the CD/MP3 function accordingly (step S210). Referring to step S207, if the scan code is determined as corresponding to an application program, the software driver module initializes an application program to execute the CD/MP3 function without via the BIOS (step S212).

Thus, the invention discloses a method and an apparatus for utilizing software to implement hot key functions without an embedded controller. The invention utilizes a software solution to implement hot key switching and hot key functions in a computer system without an embedded controller and provides the same functionality as a computer system with embedded controller, achieving the stated objects.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An apparatus for utilizing software to implement hot key functions without an embedded controller, in a computer system comprising at least one system BIOS, comprising:
   a keyboard with hot keys, comprising at least one hot key;
   a keyboard encoder, coupled with the keyboard with hot keys, producing a corresponding scan code according to the hot key used; and
   a software driver module, coupled with the keyboard encoder, comprising at least one software program, the software driver module receiving the scan code from the keyboard encoder and identifying the hot key used according to the scan code, wherein the software driver module transmits a system management interrupt to notify the at least one system BIOS when the scan code corresponds to the system BIOS, and initializes a corresponding application program when the scan code corresponds to an application program.

2. The apparatus for utilizing software to implement hot key functions without an embedded controller as claimed in claim 1, wherein, according to the software driver module, the BIOS initiates a corresponding system service routine to execute the hot key function according to the system management interrupt.

3. The apparatus for utilizing software to implement hot key functions without an embedded controller as claimed in claim 1, wherein the keyboard with hot keys comprises a standard keyboard layout.

4. The apparatus for utilizing software to implement hot key functions without an embedded controller as claimed in claim 1, wherein the keyboard with hot keys comprises a specifically designed keyboard.

5. The apparatus for utilizing software to implement hot key functions without an embedded controller as claimed in claim 1, wherein the software driver module is enabled by computer-executable program language.

6. A method for utilizing software to implement hot key functions without an embedded controller, comprising:

provinding a keyboard with hot keys, a keyboard encoder and a software driver module in a computer system without an embedded controller, the keyboard encoder producing a corresponding scan code according to the hot key used, the software driver module comprising at least one software program, for receiving the scan code, identifying the hot key used and transmitting a system management interrupt to notify a system BIOS;

when a hot key is used, the keyboard encoder producing and transmitting a corresponding hot key scan code accordingly;

the software driver module receiving the hot key scan code from the keyboard encoder and identifying the hot key used;

the software driver module determining whether the hot key scan code corresponds to a system BIOS or an application program;

the software driver module transmitting a corresponding system management interrupt to notify the system BIOS according to the hot key scan code if the scan code corresponds to the system BIOS;

the system BIOS initiating the corresponding system service routine to execute the hot key function according to the system management interrupt if the scan code corresponds to the system BIOS; and the software driver module initializing the application program if the scan code corresponds to the application program to execute the hot key function.

7. The method for utilizing software to implement hot key functions without an embedded controller as claimed in claim 6, wherein the keyboard with hot keys comprises a standard keyboard layout.

8. The method for utilizing software to implement hot key functions without an embedded controller as claimed in claim 6, wherein the keyboard with hot keys comprises a specifically designed keyboard.

9. The method for utilizing software to implement hot key functions without an embedded controller as claimed in claim 6, wherein the software driver module is enabled by computer-executable program language.

* * * * *